US012627613B1

(12) United States Patent (10) Patent No.: US 12,627,613 B1

Paiuk (45) Date of Patent: May 12, 2026

(54) PROGRAMMATIC ACTIVATION OF AN INCOGNITO MODE FOR TRANSMITTING COMMUNICATIONS

(71) Applicant: Zoom Communications, Inc., San Jose, CA (US)

(72) Inventor: Alejandro Martin Paiuk, West Hartford, CT (US)

(73) Assignee: Zoom Communications, Inc., San Jose, CA (US)

( * ) Notice: Subject to any disclaimer, the term of this patent is extended or adjusted under 35 U.S.C. 154(b) by 50 days.

(21) Appl. No.: 18/463,780

(22) Filed: Sep. 8, 2023

(51) Int. Cl.
        *H04L 47/62*        (2022.01)
        *H04L 51/42*        (2022.01)

(52) U.S. Cl.
        CPC .............. *H04L 47/62* (2013.01); *H04L 51/42* (2022.05)

(58) Field of Classification Search
        CPC ... H04L 67/568; H04L 51/214; H04L 51/224; H04L 51/222; H04L 51/226; H04L 51/234; H04L 51/21; H04L 51/04; H04L 51/043; H04L 51/02; H04L 51/212; H04L 67/54; H04L 67/535; H04L 51/00; H04L 51/42; H04L 51/48; G06Q 10/10; G06Q 10/107; G06Q 10/109
        See application file for complete search history.

(56) References Cited

U.S. PATENT DOCUMENTS 9,509,829 B2    11/2016    Culbert et al.
9,767,462 B2 *    9/2017    Byers ................... G06Q 10/107

| | | | |
|---|---|---|---|
| 10,051,107 B1 * | 8/2018 | Prasad .............. | H04M 1/72451 |
| 10,313,277 B2 * | 6/2019 | Yates ..................... | H04L 51/222 |
| 11,283,751 B1 * | 3/2022 | Jaiswal .................. | H04L 51/18 |
| 11,410,066 B2 | 8/2022 | Diehl et al. | |
| 11,412,014 B1 * | 8/2022 | Paul ..................... | H04L 65/1093 |
| 11,750,553 B2 * | 9/2023 | Robb .................. | G06Q 10/107 |
| | | | 709/206 |
| 12,231,385 B2 * | 2/2025 | Pandey .............. | H04L 12/1859 |
| 2005/0018820 A1 * | 1/2005 | Chaddha .............. | H04M 3/537 |
| | | | 379/88.13 |
| 2005/0076089 A1 * | 4/2005 | Fonseca .............. | H04L 12/1859 |
| | | | 709/206 |
| 2008/0005250 A1 * | 1/2008 | Oksum ................ | G06Q 10/109 |
| | | | 709/206 |
| 2008/0147809 A1 | 6/2008 | Byers et al. | |
| 2009/0170492 A1 | 7/2009 | Lee | |

(Continued)

FOREIGN PATENT DOCUMENTS

CN        113454666 A        9/2021
RU        2523164 C2        7/2014
WO        2016156858 A1        10/2016

*Primary Examiner* — David R Lazaro

(74) *Attorney, Agent, or Firm* — Young Basile Hanlon & MacFarlane, P.C.

(57)        ABSTRACT

Programmatic activation of an incognito mode for transmitting communications determines if a communication is schedule for sending at a later time. A request to send a communication to a second client device is received from a first client device. A determination whether an incognito mode is active is made. In response to determining that the incognito mode is active, one or more criteria are used to determine whether to delay sending the communication. In response to determining to delay the communication, the communication is scheduled to be sent to the second client device at a later time according to the one or more criteria.

20 Claims, 6 Drawing Sheets

(56)  References Cited

U.S. PATENT DOCUMENTS

| 2009/0307349 | A1* | 12/2009 | Harris | H04L 63/102 |
| | | | | 709/224 |
| 2009/0313336 | A1* | 12/2009 | Haynes | G06Q 10/107 |
| | | | | 709/206 |
| 2012/0084668 | A1* | 4/2012 | Rohnert | H04L 51/18 |
| | | | | 715/752 |
| 2012/0191546 | A1* | 7/2012 | Phelan | G06Q 30/0271 |
| | | | | 705/14.66 |
| 2013/0151630 | A1 | 6/2013 | Lawrence-Apfelbaum | |
| 2013/0275516 | A1* | 10/2013 | Grant | H04L 67/54 |
| | | | | 709/206 |
| 2014/0214971 | A1* | 7/2014 | DeLuca | H04L 51/226 |
| | | | | 709/206 |
| 2015/0207769 | A1* | 7/2015 | Lu | H04L 51/18 |
| | | | | 709/206 |
| 2016/0301648 | A1* | 10/2016 | Mistry | H04L 51/224 |
| 2017/0026331 | A1 | 1/2017 | Vijay et al. | |
| 2018/0152403 | A1* | 5/2018 | Charignon | H04L 51/216 |
| 2019/0140995 | A1* | 5/2019 | Roller | G06N 3/09 |
| 2019/0319906 | A1* | 10/2019 | Hempton | H04L 51/234 |
| 2019/0356621 | A1* | 11/2019 | Bulut | H04L 51/212 |
| 2020/0028815 | A1* | 1/2020 | He | H04L 51/52 |
| 2022/0385615 | A1* | 12/2022 | Robb | G06Q 10/107 |
| 2024/0121204 | A1* | 4/2024 | Zhang | H04L 51/046 |
| 2024/0202662 | A1* | 6/2024 | Bunke | G06Q 10/10 |

* cited by examiner

600

PROGRAMMATIC ACTIVATION OF AN INCOGNITO MODE FOR TRANSMITTING COMMUNICATIONS

FIELD

This disclosure generally relates to an electronic communication system and, more specifically, to dynamically scheduling the sending and/or receiving of electronic communications based on criteria defined by or for the sender.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
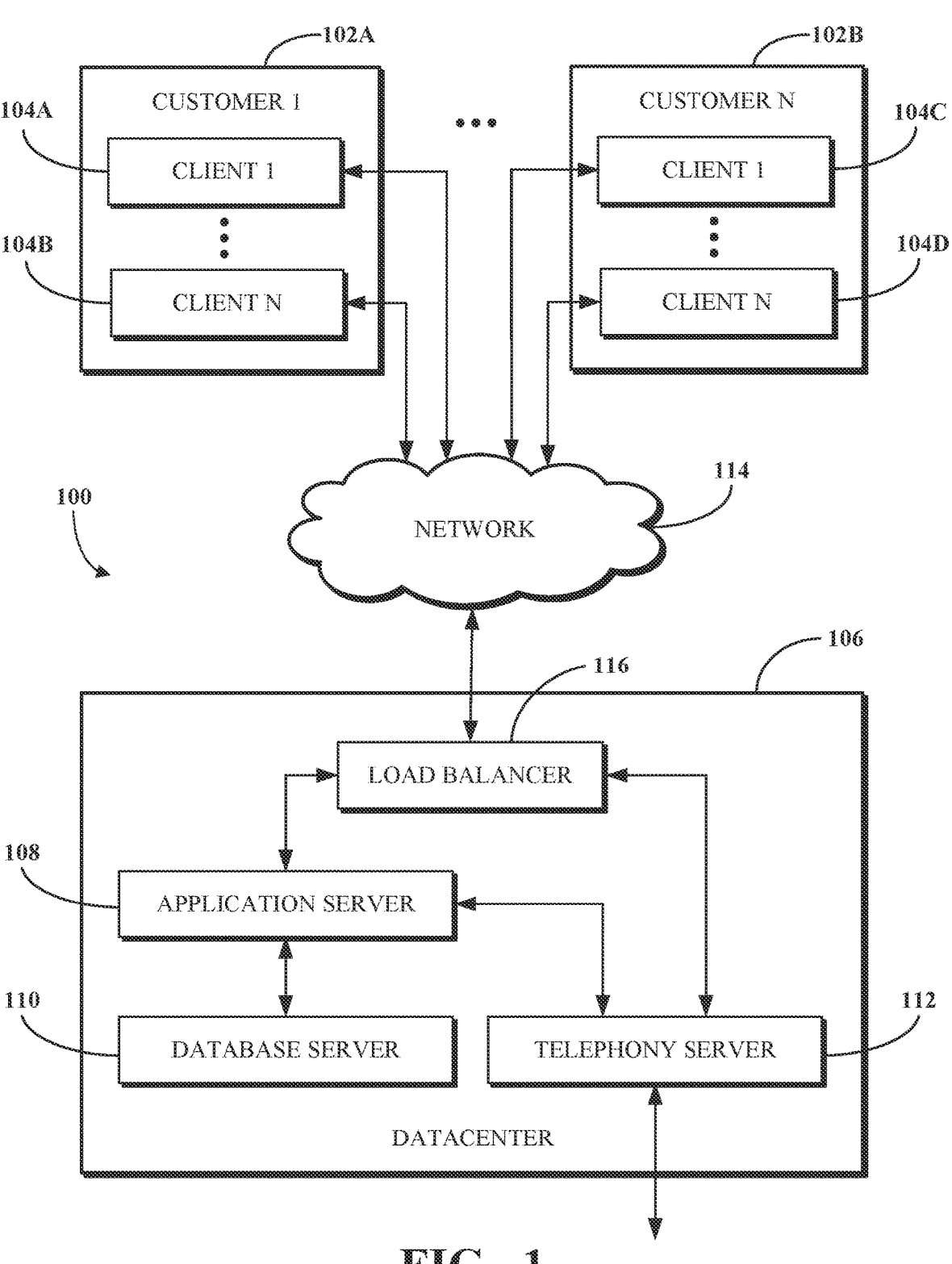
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

Many workers rely upon software services of a UCaaS or like software platform, for example, for communicating with co-workers and others. It is common for users to catch up on their work-related communications during non-business hours, such as over the weekend or late at night. However, not all recipients want to receive communications during their non-business hours, and, furthermore, many workers might not want their co-workers to know they are working during non-business hours. Additionally, users of communication software services, such as those provided by a UCaaS platform, may be located in geographically distinct locations. As such, such users could be located in different time zones in which their business hours are not aligned. Furthermore, sending business communication during non-business hours might be viewed as burdensome or unacceptable to the recipient or other users or, a user might want to hide the fact that they are available during non-business hours.

To overcome this issue, conventional communication systems, such as email exchange clients, allow users to schedule a communication to be sent at a later time. However, each such communication must be scheduled manually by the user. Manually scheduling each communication is a time consuming and onerous process susceptible to, for example, omission and failure. That is, manually scheduling each communication may lead to misuse and errors by the user scheduling the communication. For example, the user may forget or not know that a recipient is in a different time zone. In another example, the user may mistakenly schedule a message to be received based on a miscalculation of the time zone of the recipient. In yet another example, the user may not know what the recipient's business hours are or what the optimal time for a recipient to receive a message is. Furthermore, if the user desires to send the communication to more than one recipient and each recipient is located in a different time zone, the user must send individual communications to each recipient and each communication will need to be manually scheduled. As such, conventional communication systems are not designed to or capable of properly addressing these problems, for example, because they do not provide users with the technical capabilities to alleviate the problem of automatically scheduling communications to be sent at a later time.

Implementations of this disclosure address problems such as these by the programmatic activation of an incognito mode for transmitting communications using communications services of a software platform, such as a UCaaS platform. While the incognito mode is active, communications may be sent based on criteria defined by the sender. The criteria may, for example, include or otherwise refer to when the sender next logs in again during business hours, when the recipient next logs in during business hours, when a first recipient next logs in, when a preponderance of recipients are logged in concurrently, after a preponderance of recipients have logged in at least once, when all recipients are logged in concurrently, after all recipients have logged in at least once, when the sender's business hours next begin, when the recipient's business hours begin, when the first recipient's business hours begin, when the majority of recipient's business hours overlap, when the optimal time to send the message based on when it is most likely to be read, and/or different delivery times based on each recipient. The sender can set criteria to have each message schedule for delivery based on a number of factors such as, for example, a status of the user (e.g., next logged in during business-hours) or a status of the recipient, the number of recipients, a specific time, or any other data known by the system. Implementations of this disclosure allow for a UCaaS that provides a more flexible communication system capable of increasing user efficiency and reducing errors in scheduling communications to be sent at later times.

To describe some implementations in greater detail, reference is first made to examples of hardware and software structures used to implement a system for dynamically scheduling communications for delivery based on predefined criteria. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
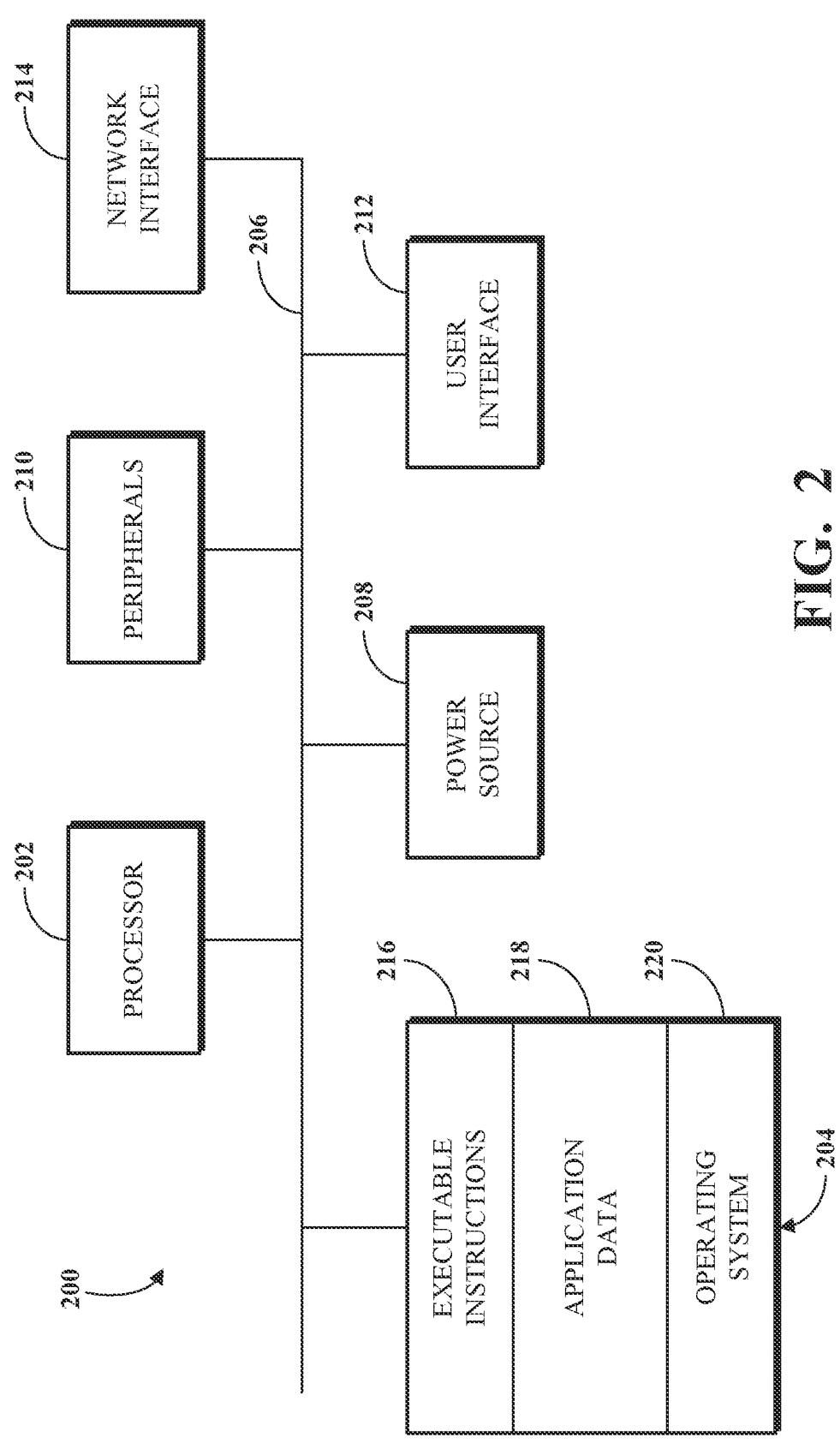
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
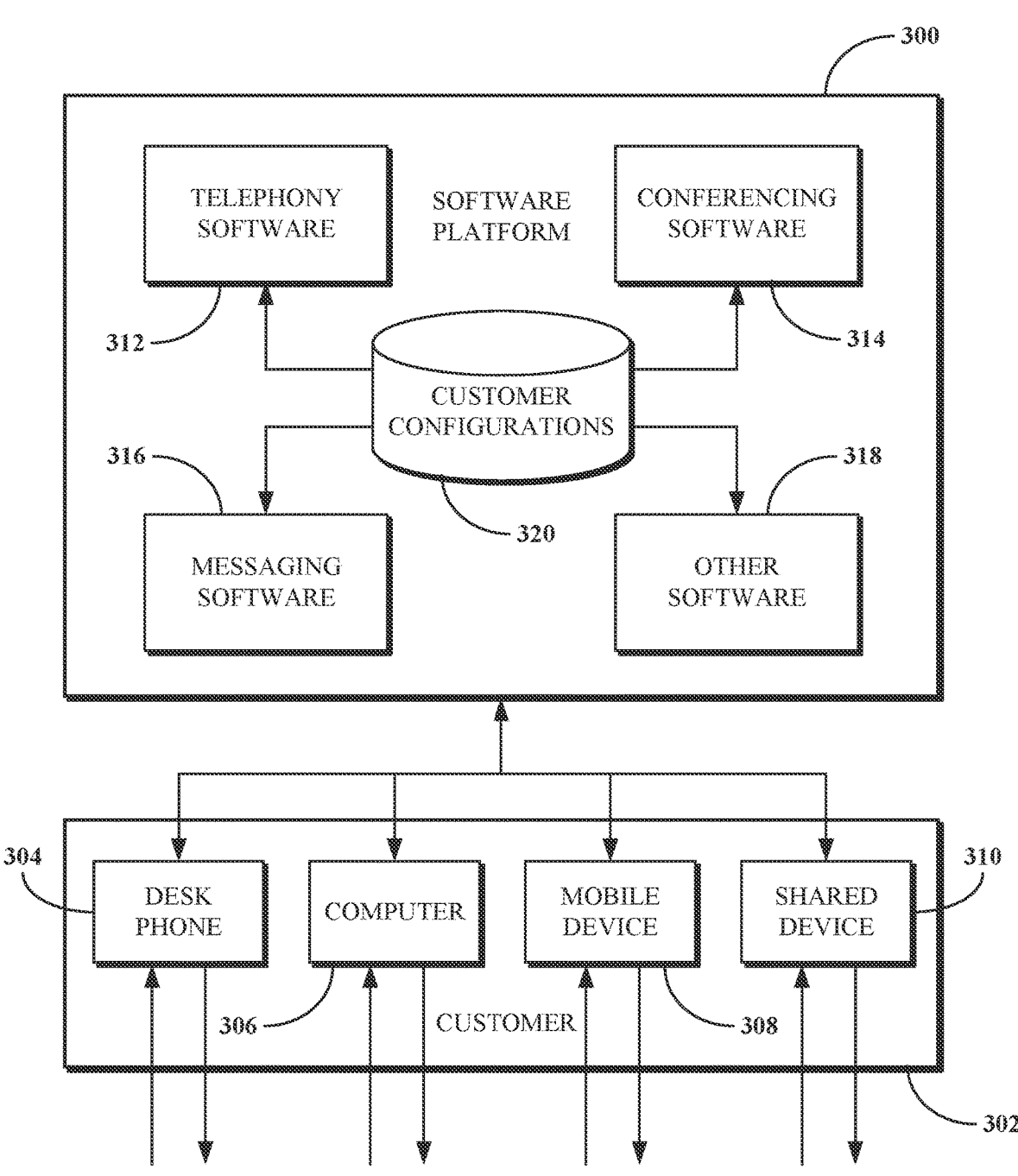
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302, which may, for example, be the customer 102A, the customer 102B, or another customer, as shown includes four clients 304 through 310—a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like In one particular example, the other software 318 may be included within the messaging software 316.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
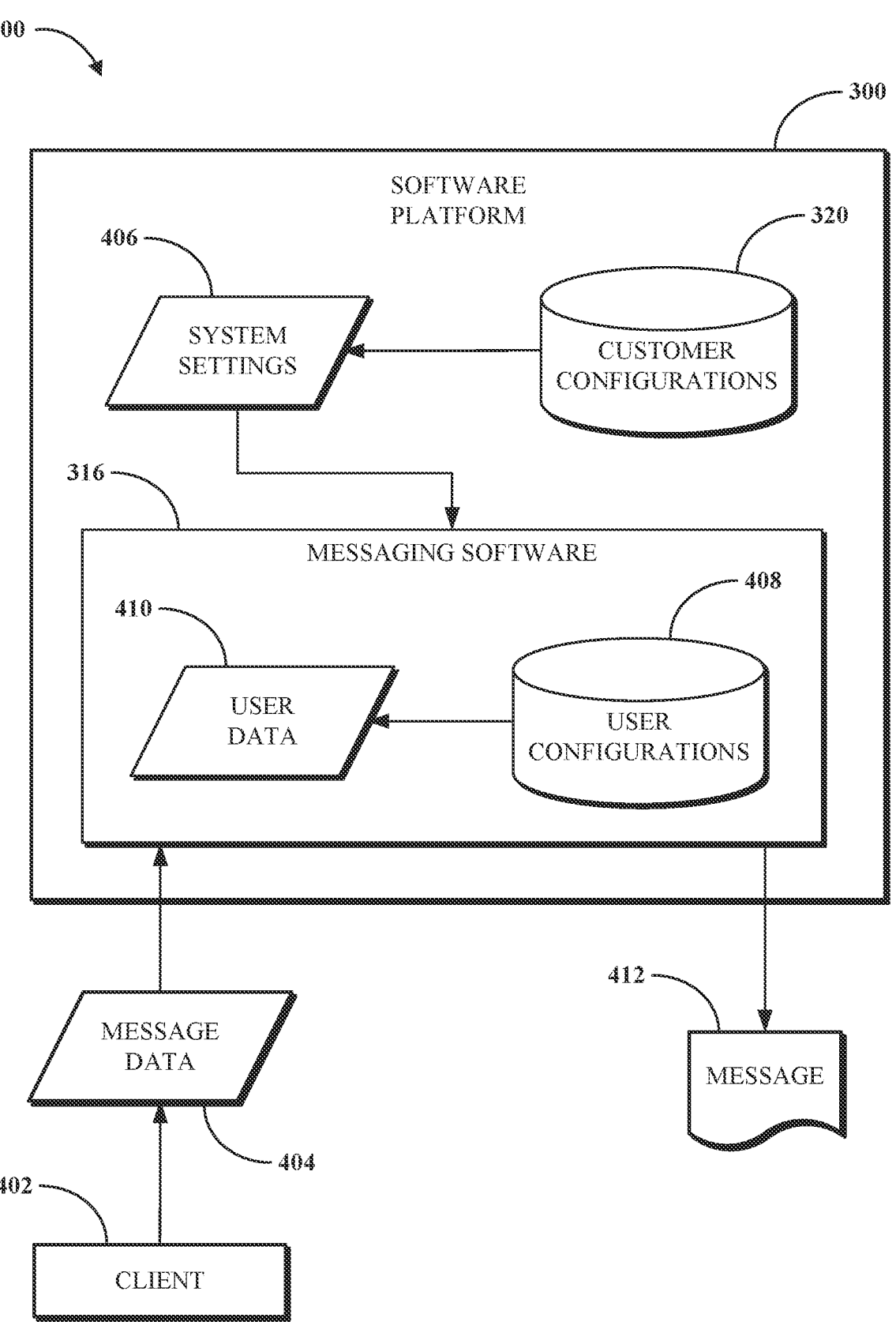
FIG. 4 is a block diagram of an example of a data flow for messaging software used for dynamic criteria-based communication scheduling.

FIG. 4 is a block diagram of an example of a data flow for the messaging software 316 used for dynamic criteria-based communication scheduling. The messaging software 316 is configured to dynamically (i.e., without manual user intervention) determine times and/or dates at which to schedule the sending of one or more message-based communications (e.g., emails or the like) each to one or more recipients. In particular, the messaging software 316 may use data from internal data sources, various connected systems within the software platform 300, and/or external data sources to dynamically schedule communications based on one or more criteria associated with a user of the messaging software 316. For example, the messaging software 316 may use system settings 406 that may be stored within the customer configurations 320. The customer configurations 320 may be maintained by the software platform 300. As such, the system settings 406 may be transmitted to the messaging software 316 as a connected system within the software platform 300. In another example, the messaging software 316 may receive message data 404 from a client 402. The client 402 may be connected to the software platform 300; however, the client may not be a part of the software platform 300. As such, the client 402 may be an external data source to the messaging software 316. Additionally, the messaging software 316 may retrieve user data 410 from user configurations 408. The user configurations 408 may be maintained by the messaging software 316. As such, the user data 410 may be retrieved from an internal data source. Lastly, the messaging software 316 may generate a message 412 as output.

The client 402 is a client device configured to access the messaging software 316 to generate the message data 404, which corresponds to one or more messages to be communicated to one or more recipients via the messaging software 316. For example, the client 402 may be one of the clients 304 through 310 of FIG. 3. The client 402 may generate the message data 404 as part of a request to send a communication to another client or client device. The message data 404 may include metadata describing the type of communication. The message data 404 may also include one or more of a list of recipients for the communication, sender information, a subject of the communication, a body of the communication, and/or one or more attachments for the communication. The message data may be transmitted to the software platform 300 directly using a software development kit (SDK), an application programming interface (API), or another suitable method for transmitting the message data 404 to the designated recipients via the software platform 300.

The customer configurations 320 may be used to retrieve the system settings 406, which represent a subset of the customer configurations 320 that is specific to message communication. In particular, the system settings 406 are specific to a customer of the software platform with which the sender is associated, for example, the customer 302 of FIG. 3. The system settings 406 may include a setting for whether an incognito mode may be activated, a list of criteria that the messaging software 316 may use to determine when the communication may be scheduled for delivery, or another setting that may be appropriate for use within the message software 316. The setting for whether the incognito mode may be activated may be defined by a system administrator of the customer of the software platform 300. The setting may allow the system administrator to activate the incognito mode based on predefined time periods, individual user schedules, individual user settings, or another available configuration.

The list of criteria that the messaging software 316 may use may include any available criteria within the system. For example, the list may include recipient time zone, recipient geographic location, recipient active hours, a predefined time period, sender time zone, sender geographic location, sender active hours, a plurality of recipients and their respective active hours, a first active time of the recipients or the sender. In another example, the list of criteria may include only a subset of the available criteria. As such the system administrator may only allow a subset of the criteria to be used to determine when a message may be scheduled to be sent.

While the list of criteria includes specific data elements as options, these are not the only data elements that may be available within the software platform 300. The list of available criteria may include more or fewer data elements as may be appropriate within the configuration of the software platform 300.

The user data 410 may be generated from the user configurations 408. The user configurations 408 are user-specific settings stored for use with the messaging software 316. The user configurations 408 may be defined for use with the messaging software 316. The user configurations 408 may include data about active hours of a user, geographic information, time zone information, user status information, or other information about the user. The user configuration 408 may, for example, be data stored within a database or other data store at a database server, such as the database server 110 shown in FIG. 1.

The messaging software 316 may output a message 412. The message 412 may be generated from the message data 404 provided by the client 402. The messaging software 316 may process the message data 404 to create a message 412. The message 412 may be an instant message, a unified message (e.g., an email message) or another type of message that the messaging software 316 is capable of handling. Additionally, the messaging software 316 may use the system settings 406 and the user data 410 to dynamically determine when the message may be transmitted. The message may be transmitted to another user of the software platform 300 or the message 412 may be transmitted to a user of an external messaging platform.

Figure 5:
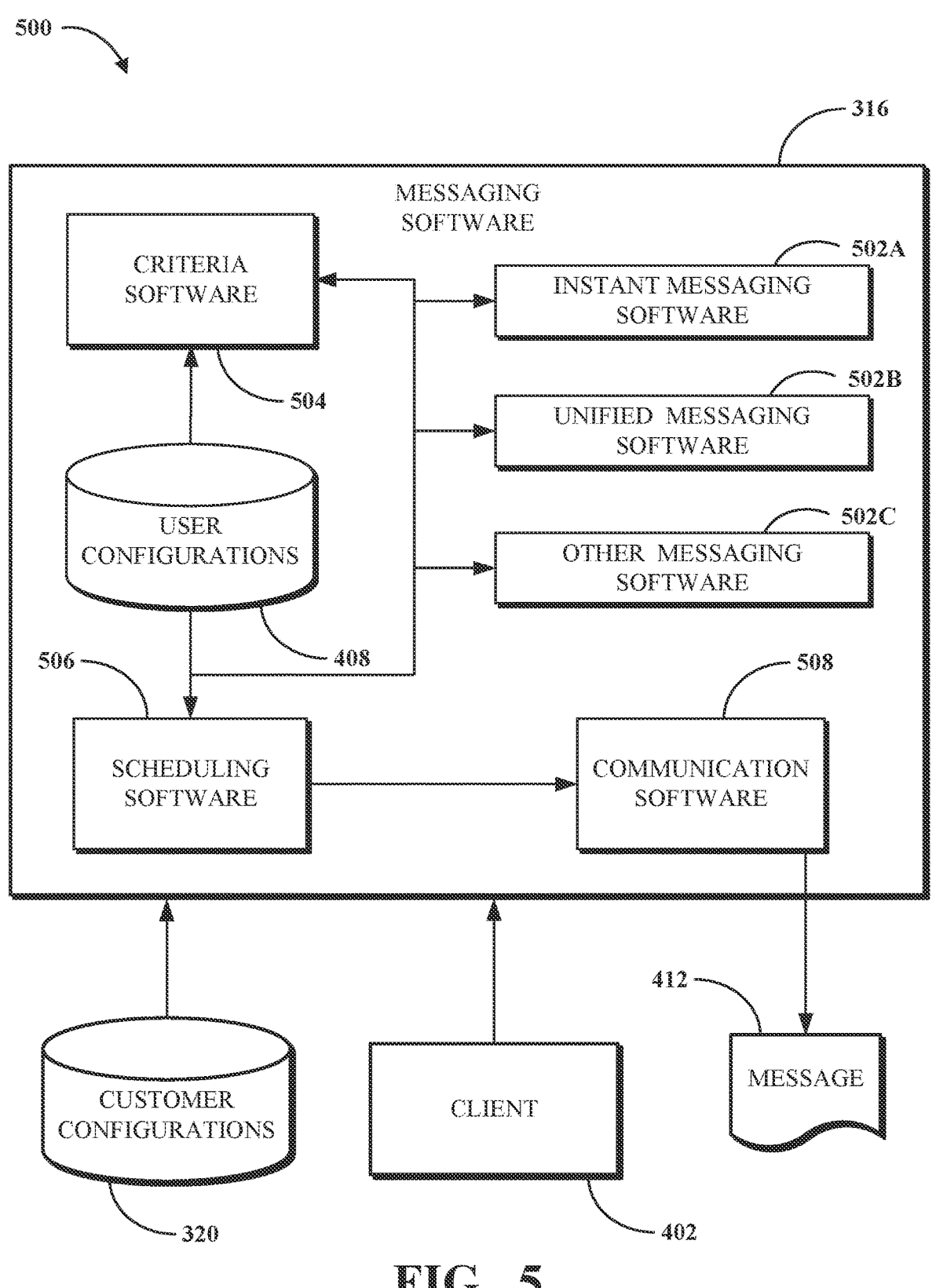
FIG. 5 is a block diagram of an example of messaging software for dynamically scheduling communications based on predefined criteria.

FIG. 5 is a block diagram of an example of the messaging software for dynamically scheduling communications based on predefined criteria. While FIG. 4 is an example of the data that may flow through the software platform 300 and subsequently into the messaging software 316, FIG. 5 is an example of the various subsystems within the messaging software 316 that may utilize the data to generate and schedule the communication. The messaging software 316 may receive a request from the client 402 to send a communication to a recipient. The messaging software 316 may receive the request for communication at the appropriate messaging software 502A through 502C. For example, the client 402 may generate a request to send a communication via instant message to a colleague. The messaging software 316 may receiving the request from the client 402 at the instant messaging software 502A. The instant messaging software 502A may receive the request for communication and interpret the request as an instant message. In another example, the client may send a request to send a communication via email to another colleague. The messaging software 316 may receive the request at the unified messaging software 502B and interpret the request as an email message. In either case, the request is received by the messaging software 316 and processed by the messaging software 502A through 502C as appropriate for the type of the message being requested. While FIG. 5 shows three types of messaging software 502A through 502C by example, the messaging software 316 of the software platform 300 may instead include or otherwise use fewer or more types of messaging software.

The messaging software 316 uses criteria software 504 to evaluate criteria associated with a request for communication (e.g., a message to schedule). The criteria software 504 may receive a request for communication from the messaging software 502A through 502C along with the message data 404 from the client 402. The criteria software 504 may process the communication request in connection with relevant criteria to determine whether the message should be delayed. To evaluate the criteria associated with the communication request, the criteria software 504 may use message data (e.g., the message data 404 of FIG. 4) from the client 402, user data (e.g., the user data 410 of FIG. 4) from the user configurations 408, and/or system settings (e.g., the system settings 406 of FIG. 4) from the customer configurations 320. The criteria software 504 may thus determine that the request to send a communication may be delayed. For example, the criteria software 504 may receive the request for communication in which the user setting for incognito mode is active. The message data may also include metadata including criteria used to determine that the message may be delayed for sending until the message may be received during the active hours of the recipient. The criteria software 504 may receive user data from the user configurations 408 in order to determine if the recipient is a user of the software platform 300. The criteria software 504 may determine that the recipient is a user of the software platform 300; however, the request for communication may have been received outside of the active hours of the recipient.

The criteria software 504 may further determine that the communication to the recipient may need to be delayed.

The scheduling software 506 may be used by the messaging software 316 to schedule a communication for sending. The scheduling software 506 may determine the schedule for when the communication is sent based on the determination from the criteria software 504. The scheduling software 506 may receive the determination from the criteria software 504 to delay the communication. The scheduling software 506 may schedule the communication until the criteria associated with the message data 404 evaluates to a positive (i.e., true) result. For example, the scheduling software 506 may receive the request from the criteria software 504 with a determination to delay the communication until the active hours of the recipient begin. The scheduling software 506 may retrieve the active hours of the recipient from the user configurations 408 and based on the active hours of the recipient schedule the communication to be sent.

The communication software 508 may send the communication at the scheduled time. The communication software 508 may receive a communication request from the scheduling software and send the communication at a specified time (e.g., current time, predefined time, later time, optimal time, etc.). The communication software 508 may also transform the communication request to the message 412. The communication software may accomplish the transformation utilizing the message data received from the client 402, the request for communication as processed by the messaging software 504A through 504C, and the schedule received from the scheduling software 506. For example, the communication software 508 may receive from the scheduling software 506 a request to send an email message at the start of the active hours of the recipient. The scheduling software 506 may have determined that the active hours of the recipient may be 9:00 o'clock eastern standard time. As such the communication software 508 may send an email message to the recipient at 9:00 o'clock eastern standard time.

In another example, the communication software 508 may receive from the scheduling software 506 a request to send a communication at the earliest time in which all the recipients have overlapping business hours. The communication may be intended for two recipients. The two recipients may be in two different time zones such as eastern standard time and pacific standard time. Both recipients may have active hours, as determined by the scheduling software 506, that begin at 8:00 o'clock in their respective time zone. However, due to the time zone difference and the criteria to send the message when both recipients have overlapping active hours, the communication software 508 may send the communication to each recipient at a different time during their respective active hours. In this case, the communication software 508 may send the communication to the recipient in the eastern time zone at 11:00 o'clock eastern standard time, while the communication software 508 may send the communication to the recipient in the pacific time zone at 8:00 o'clock pacific standard time. In either case, the communication software 508 may be able to transform the communication into the message 412 as a single message since the only difference in the delivery time of the communication to the recipients is the time zone difference.

In a further example, the communication software 508 may receive from the scheduling software 506 a request to send a communication to each recipient at the start of their respective active hours. The communication may be intended for two recipients. The two recipients may be in different time zones such as central standard time and mountain standard time. Both recipients may have active hours starting at 9:00 o'clock in their respective time zone. However, because of the different time zone and the requirement that each recipient receives the message at the beginning of their respective active hours, the communication software 508 may send the communication to each recipient at different times. As such, the communication software 508 may send the communication to the recipient in the central standard time zone first at 9:00 o'clock central standard time, while the communication software 508 may send the communication to the recipient in the mountain standard time zone one hour later at 9:00 o'clock mountain standard time. In this case, the communication software may transform the communication into two separate messages, each a message 412, one for each individual recipient since each message 412 was scheduled to be delivered at a different relative time based on the time zones.

Figure 6:
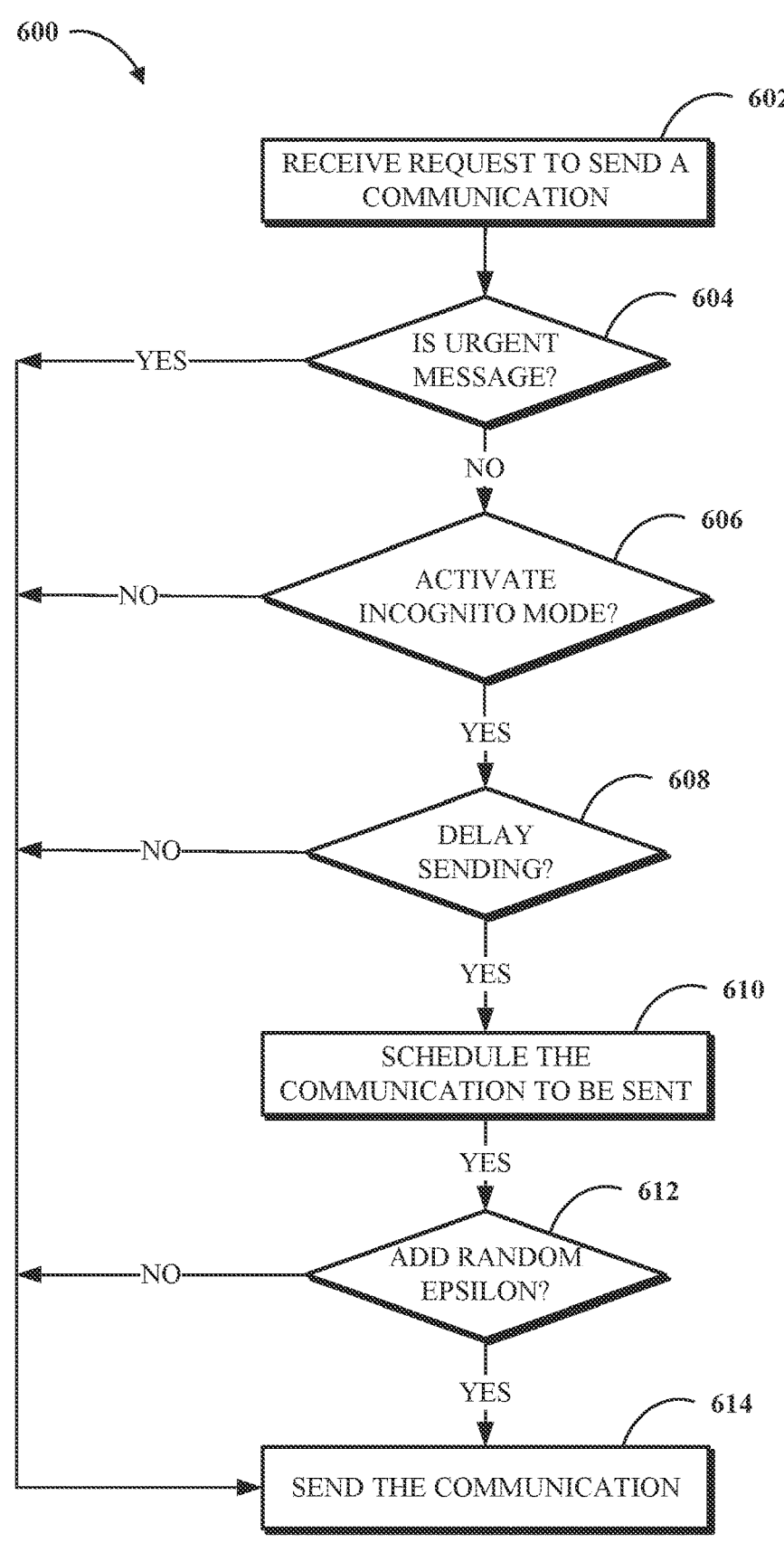
FIG. 6 is a flowchart of an example of a technique 600 for dynamically scheduling communications based on predefined criteria.

FIG. 6 is a flowchart of an example of a technique 600 for dynamically scheduling communications based on predefined criteria. The technique 600 is depicted as a series of steps or operations 602 through 614, which are described below. The technique 600 can be implemented in whole or in part by the messaging software 316 of FIG. 3. Instructions for performing the technique 600 can be stored in a memory subsystem (e.g., including the memory 204 of FIG. 2) that can be executed by processing circuitry (e.g., including processor 202 of FIG. 2) of one or more computers (such as the computing device 200 of FIG. 2). The technique 600 may be implemented in whole or in part by a datacenter (such as at the datacenter 106 of FIG. 1).

The technique 600 includes using inputs. For example the technique 600 may include receiving inputs, the inputs may include message data, such as the message data 404 from FIG. 4, system settings, such as the system settings 406 of FIG. 4, and user data, such as the user data 410 of FIG. 4. The message data, the system settings and the user data can be used by the technique 600 to interpret and send the request for communication. That is, for example, the message data can be used to determine a type and a content of a message to send. The system settings and the user data can be used to determine whether the message may be delayed (e.g. is authorized to be delayed), to evaluate the criteria associated with the message, and to schedule the message for delivery.

At operation 602, the technique 600 includes receiving a request to send a communication. The request may be received from a user of a first device and the recipient of the communication may be a user of a second device. The request may be to send an email message, an instant message, a recorded image, audio or video message (e.g., screenshots, screen recordings, etc.) or another form of message that the software platform, such as the software platform 300 is capable of processing. For example, a first user of a first user device may send a request to send a communication to a second user of a second user device. The first user may have requested to send an email message. As such the technique 600 would interpret the request to send a communication as a request to send an email message to the second user.

At operation 604, the technique 600 includes determining if the request to send the communication is an urgent request. That is, is the communication an urgent communication that may be sent without delay. A communication may be determined to be urgent based on the message data received from the client, such as the client 402 of FIG. 4, with the request to send the communication. The message data may contain metadata that can be used to determine that the communication is an urgent communication. The metadata may be defined by utilizing a graphical user interface of the client device designating the communication as urgent. Alternatively, the meta data may be defined dynamically by the software platform, such as the software platform 300 of FIG. 3, based on the contents of the message data. If the request for communication is determined to be an urgent request for communication, the process proceeds to operation 614; otherwise, the process proceeds to operation 606.

At operation 606, the technique 600 includes determining if an incognito mode is active. The incognito mode may be activated based on user settings, system settings, or manually by the user. That is, a system administrator of the software platform, such as the software platform 300, may determine that the incognito mode may be activated automatically based on the active hours of a user. For example, the system administrator may define a setting that enables the incognito mode for a user at the end of the defined working hours of the user. As such, if a user sends a request to send a communication after the working hours of the user, the incognito mode will be activated.

In another example, the activation of the incognito mode may be determined by a setting defined by the user. The user may determine that incognito mode may be activated every day after 6:30 PM. As such, if the user sends a request for communication at 6:00 PM the incognito mode will not be activated. However, if the user sends the request for the communication at 6:45 PM, the incognito mode be activated. If the technique 600 determines that the incognito mode is active the process proceeds to operation 608; otherwise the process proceeds to operation 614.

At operation 608, the technique 600 includes determining if the communication may be delayed. The communication may be delayed based on an evaluation of criteria associated with the request to send the communication. The criteria may be evaluated by the criteria software 504 of FIG. 5. The criteria may be defined as part of the message data, such as the message data 404, received from the client, such as the client 402. The determination to delay the communication may be based on a negative (i.e., false) evaluation of the criteria. For example, the client may define criteria on outgoing messages such that if the incognito mode is activated, the communications sent may be delivered when a majority of the recipients have a status of active. If the majority of the recipients do not have a status of active, when the request to send the communication is received the communication may be delayed until the evaluation of the criteria is positive (i.e., true). If the operation 608 determines that the communication may be delayed, the technique 600 proceeds to operation 610; otherwise, the technique 600 proceeds to operation 614.

At operation 610, the communication is scheduled to be sent. The communication is scheduled to be sent based on the criteria associated with the message data. In the words, if the communication may be delayed, then the communication may need to be sent at a later time. However, the later time has not yet been determined. The communication may be scheduled for delivery using the scheduling software 506 of FIG. 5. The later time may be determined by the criteria as evaluated by the criteria software 504 of FIG. 5. The criteria software 504 may send a criteria determination to the scheduling software 506. The determination may be used to determine the appropriate later time to send the communication.

At operation 612, the technique 600 includes determining whether a random epsilon may be added to the scheduled time to send the communication. That is, a random amount of time may be added to each message that is scheduled to be sent at a later time. For example, when the incognito mode is active and the communication is scheduled to be sent at a later time there may be numerous messages that are schedule to be delivered to the same recipient at the same time. As such, when the recipient receives numerous messages at the same time, the recipient may be overwhelmed. Alternatively, when the recipient receives numerous message at the same time, the recipient may be made aware that the sender sent the messages using the incognito mode. Adding a random epsilon to the later time may prevent the messages from arriving at the same time, therefore preventing the recipient from being overwhelmed or discerning that the sender sent the messages using the incognito mode. The random epsilon may be defined by the system administrator, or a user. The random epsilon may be received as a part of the system settings, the user settings, or the message data.

At operation 614, the technique 600 includes sending the communication according to the scheduled time. The communication may be sent using the communication software 508 of FIG. 5. The schedule time may be a later time, or a predefined time. The predefined time may be a time selected by the sender, a time selected by the recipient, an optimal time for the recipient to receive the message, or the current time. For example, if the communication was determined to be an urgent message at operation 604 or if the incognito mode is determined to not be active at operation 606, or the operation 608 determines that the communication need not be delayed, the message may be sent immediately (i.e., the current time). In another example, if the message is determined to be delayed, the predefined time may be determined by the sender of the communication using the criteria defined by the sender. Alternatively, the sender may define criteria that allows for the recipient to control when messages sent using incognito mode are delivered. As such the predefined time may be determined by the recipient of the communication. In a further example, the predefined time may be determined by the software platform 300 based an optimal time for the recipient to receive the communication. That is the software platform may be determine, based on the past viewing habits of the recipient, a time that the recipient is most likely to read the received communications.

To further describe some implementations in greater detail, reference is next made to examples of techniques which may be performed by or using a system for dynamically scheduling communications for delivery based on predefined criteria. FIG. 6 is a flowchart of an example of a technique 600 for dynamically scheduling communications for delivery based on predefine criteria. The technique 600 can be executed using computing devices, such as the systems, hardware, and software described with respect to FIGS. 1-5. The technique 600 can be performed, for example, by executing a machine-readable program or other computer-executable instructions, such as routines, instructions, programs, or other code. The steps, or operations, of the technique 600, or another technique, method, process, or algorithm described in connection with the implementations disclosed herein can be implemented directly in hardware, firmware, software executed by hardware, circuitry, or a combination thereof.

For simplicity of explanation, the technique 600 is depicted and described herein as a series of steps or operations. However, the steps or operations of the technique 600 in accordance with this disclosure can occur in various orders and/or concurrently. Additionally, other steps or operations not presented and described herein may be used.

Furthermore, not all illustrated steps or operations may be required to implement a technique in accordance with the disclosed subject matter.

The implementations of this disclosure correspond to methods, non-transitory computer readable media, apparatuses, systems, devices, and the like. In some implementations, a method comprises receiving, from a first client device, a request to send a communication to a second client device; determining whether an incognito mode is active; in response to determining that the incognito mode is active, determining whether to delay the communication based on one or more criteria; and in response to determining to delay the communication, scheduling to send the communication to the second client device at a later time according to the one or more criteria. In some implementations, a non-transitory computer readable storage device including program instructions that, when executed by a processor of a first client device, cause the processor to perform operations, the operations comprising receiving, from the first client device, a request to send a communication to a second client device; determining whether an incognito mode is active; in response to determining that the incognito mode is active, determining whether to delay the communication based on one or more criteria; and in response to determining to delay the communication, scheduling to send the communication to the second client device, at a later time, according to the one or more criteria. In some implementations, a system, comprising a memory subsystem configured to store instructions; and processing circuitry configured to execute instructions to receive, from a first client device, a request to send a communication to a second client device; determine whether an incognito mode is active; in response to a determination that the incognito mode is active, determine whether to delay the communication based on one or more criteria; and in response to a determination to delay the communication, schedule to send the communication to the second client device, at a later time, according to the one or more criteria.

In some implementations of the method, non-transitory computer readable medium, or system, the one or more criteria includes at least one of a status, a time zone, or a geographic location of a user of the second client device.

In some implementations of the method, non-transitory computer readable medium, or system, the method comprises, the operations comprise, and the processing circuitry is configured to execute instructions for receiving, from the first client device, an urgent request to send the communication to the second client device; and in response to receiving the urgent request, sending the communication to the second client device within a predefined time period.

In some implementations of the method, non-transitory computer readable medium, or system, the one or more criteria includes at least one of a status of a user of the first client device, a number of recipients, or an optimal time for a user of the second client device to read the communication.

In some implementations of the method, non-transitory computer readable medium, or system, the method comprises, the operations comprise, and the processing circuitry is configured to execute instructions for determining whether at least one of the one or more criteria includes a predefined time period of a user of the second client device; and responsive to determining that at least one of the one or more criteria includes the predefined time period of the user of the second client device, adding a random epsilon to the later time.

In some implementations of the method, non-transitory computer readable medium, or system, an availability of the one or more criteria is based on a setting defined by a system administrator.

In some implementations of the method, non-transitory computer readable medium, or system, the method comprises, the operations comprise, and the processing circuitry is configured to execute instructions for activating the incognito mode based on a setting defined by at least one of a user of the first client device or a system administrator.

In some implementations of the method, non-transitory computer readable medium, or system, the method comprises, the operations comprise, and the processing circuitry is configured to execute instructions for activating the incognito mode by a user of the first client device.

In some implementations of the method, non-transitory computer readable medium, or system, the determining to delay the communication comprises at least one of determining a status of a user of the second client device; determining a time zone of the user of the second client device; or determining a geographic location of the user of the second client device.

In some implementations of the method, non-transitory computer readable medium, or system, the method comprises, the operations comprise, and the processing circuitry is configured to execute instructions for determining whether the communication is an urgent communication; and in response to a determination that the communication is an urgent communication, sending the communication to the second client device within a predefined time period.

In some implementations of the method, non-transitory computer readable medium, or system, the incognito mode is activated based on a setting defined by a user of the first client device.

In some implementations of the method, non-transitory computer readable medium, or system, the scheduling to send the communication comprises: determining a number of recipients for the communication; generating a message corresponding to one of the recipients of the communication, wherein the one of the recipients is a user of the second client device; and setting a delivery time of the message to the user of the second client device based on a predefined time period.

In some implementations of the method, non-transitory computer readable medium, or system, the method comprises, the operations comprise, and the processing circuitry is configured to execute instructions for determining whether at least one of the one or more criteria are based on an optimal time for a user of the second client device to read the communication; and responsive to a determination that one or more criteria is based on the optimal time for the user of the second client device to read the communication, adding a random epsilon to the later time.

In some implementations of the method, non-transitory computer readable medium, or system, the scheduling to send the communication to the second client device comprises, determining a status of a user of the second client device; and in response to a determination that the status of the user of the second client device is inactive, setting a delivery time of the communication to the second client device based on at least one of a time zone or a geographic location of the user of the second client device.

In some implementations of the method, non-transitory computer readable medium, or system, the method comprises, the operations comprise, and the processing circuitry is configured to execute instructions for sending the communication to the second client device within a predefined time period, wherein the communication is an urgent communication.

In some implementations of the method, non-transitory computer readable medium, or system, the method comprises, the operations comprise, and the processing circuitry is configured to execute instructions for receiving a system setting defined by a system administrator; and activating the incognito mode based on the system setting.

In some implementations of the method, non-transitory computer readable medium, or system, the method comprises, the operations comprise, and the processing circuitry is configured to execute instructions for determining a status of a user of the first client device; determining a number of recipients; or determining an optimal time for a user of the second client device to read the communication.

In some implementations of the method, non-transitory computer readable medium, or system, the method comprises, the operations comprise, and the processing circuitry is configured to execute instructions for adding a random epsilon to the later time based on a setting defined by a user of the first client device.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

The implementations of this disclosure can be described in terms of functional block components and various pro-cessing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

receiving, from a first client device, a request to send a communication to a second client device;

determining whether an incognito mode is active, wherein, when the incognito mode is active, automatic scheduling of the communication for delayed transmission is authorized without further input from the first client device;

in response to determining that the incognito mode is active, determining whether to delay the communication based on one or more criteria, wherein the one or more criteria includes at least one criteria directed to a user of the first client device;

in response to determining to delay the communication, automatically scheduling to send the communication to the second client device at a later time according to the one or more criteria; and adding a random epsilon to the later time based on a setting defined by a user of the first client device.

2. The method of claim 1, wherein the one or more criteria includes at least one of a status, a time zone, or a geographic location of a user of the second client device.

3. The method of claim 1, further comprising:

receiving, from the first client device, an urgent request to send the communication to the second client device; and in response to receiving the urgent request, sending the communication to the second client device within a predefined time period.

4. The method of claim 1, wherein the one or more criteria includes at least one of a status of a user of the first client device, a number of recipients, or an optimal time for a user of the second client device to read the communication.

5. The method of claim 1, further comprising:

determining whether at least one of the one or more criteria includes a predefined time period of a user of the second client device; and responsive to determining that at least one of the one or more criteria includes the predefined time period of the user of the second client device, setting the later time to a time within the predefined time period.

6. The method of claim 1, wherein an availability of the one or more criteria is based on a setting defined by a system administrator.

7. The method of claim 1, further comprising:

activating the incognito mode based on a setting defined by at least one of a user of the first client device or a system administrator.

8. The method of claim 1, further comprising:

activating the incognito mode by a user of the first client device.

9. A non-transitory computer readable storage device including program instructions that, when executed by a processor of a first client device, cause the processor to perform operations, the operations comprising:

receiving, from the first client device, a request to send a communication to a second client device;

determining whether an incognito mode is active, wherein, when the incognito mode is active, automatic scheduling of the communication for delayed transmission is authorized without further input from the first client device;

in response to determining that the incognito mode is active, determining whether to delay the communication based on one or more criteria, wherein the one or more criteria includes at least one criteria directed to a user of the first client device;

in response to determining to delay the communication, automatically scheduling to send the communication to the second client device, at a later time, according to the one or more criteria; and adding a random epsilon to the later time based on a setting defined by a user of the first client device.

10. The non-transitory computer readable storage device of claim 9, wherein determining to delay the communication comprises at least one of:

determining a status of a user of the second client device;

determining a time zone of the user of the second client device; or determining a geographic location of the user of the second client device.

11. The non-transitory computer readable storage device of claim 9, the operations further comprising:

determining whether the communication is an urgent communication; and in response to a determination that the communication is an urgent communication, sending the communication to the second client device within a predefined time period.

12. The non-transitory computer readable storage device of claim 9, wherein the incognito mode is activated based on a setting defined by a user of the first client device.

13. The non-transitory computer readable storage device of claim 9, wherein scheduling to send the communication comprises:

determining a number of recipients for the communication;

generating a message corresponding to at least one of the number of recipients for the communication, wherein the at least one of the number of recipients is a user of the second client device; and setting a delivery time of the message to the user of the second client device based on a predefined time period.

14. The non-transitory computer readable storage device of claim 9, the operations further comprising:

determining whether at least one of the one or more criteria are based on an optimal time for a user of the second client device to read the communication; and responsive to a determination that one or more criteria is based on the optimal time for the user of the second client device to read the communication, setting the later time to the optimal time.

15. A system, comprising:

a memory subsystem configured to store instructions; and processing circuitry configured to execute instructions to:

receive, from a first client device, a request to send a communication to a second client device;

determine whether an incognito mode is active, wherein, when the incognito mode is active, automatic scheduling of the communication for delayed transmission is authorized without further input from the first client device;

in response to a determination that the incognito mode is active, determine whether to delay the communication based on one or more criteria, wherein the one or more criteria includes at least one criteria directed to a user of the first client device;

in response to a determination to delay the communication, automatically schedule to send the communication to the second client device, at a later time, according to the one or more criteria; and add a random epsilon to the later time based on a setting defined by a user of the first client device.

16. The system of claim 15, wherein, to schedule to send the communication to the second client device, the processing circuitry is configured to execute the instructions to:

determine a status of a user of the second client device; and in response to a determination that the status of the user of the second client device is inactive, set a delivery time of the communication to the second client device based on at least one of a time zone or a geographic location of the user of the second client device.

17. The system of claim 15, wherein the processing circuitry is configured to execute the instructions to:

send the communication to the second client device within a predefined time period, wherein the communication is an urgent communication.

18. The system of claim 15, wherein the processing circuitry is configured to execute the instructions to:

receive a system setting defined by a system administrator; and activate the incognito mode based on the system setting.

19. The system of claim 15, wherein, to determine to delay the communication, the processing circuitry is configured to execute the instructions to:

determine a status of a user of the first client device;

determine a number of recipients; or determine an optimal time for a user of the second client device to read the communication.

20. The system of claim 15, wherein the processing circuitry is configured to execute the instructions to:

determine whether at least one of the one or more criteria are based on an optimal time for a user of the second client device to read the communication; and responsive to a determination that one or more criteria is based on the optimal time for the user of the second client device to read the communication, set the later time to the optimal time.

* * * * *